3,548,451
APPARATUS FOR REMOVING EXPANDED
PLASTIC ARTICLES FROM FORMING
MOLDS
Arieh Carmi and Thomas J. Rayeski, Corning, N.Y.,
assignors to Corning Glass Works, Corning, N.Y., a
corporation of New York
Filed May 11, 1967, Ser. No. 637,790
Int. Cl. B29f 1/14; B29d 27/00
U.S. Cl. 18—2                                             2 Claims

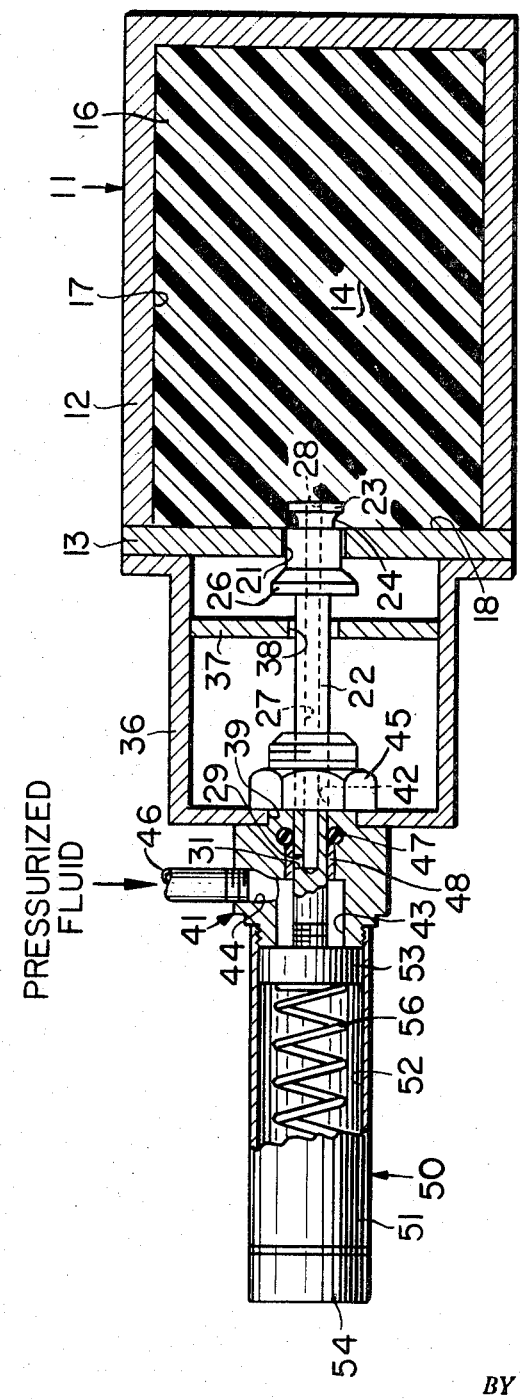

ABSTRACT OF THE DISCLOSURE

An apparatus for separating expansively molded plastic articles from forming molds comprising two or more mold parts. The head of a headed hollow piston rod is inserted through an orifice in one of the mold parts and into the mold cavity formed by such parts, and the plastic article is formed about such head to maintain the article against said one mold part during separation of the mold parts. Following separation of mold parts the rod is actuated out of said cavity to disembed the head from the formed article and pressurized fluid is supplied to the hollow of the rod to impinge upon the article and disengage it from said one mold part.

BACKGROUND OF THE INVENTION

The invention relates to expanded plastic article forming and more specifically to articles formed in a mold by thermal expansion of thermally expandable plastic particles such as polystyrene particles, for example.

In molding plastic articles from an expandable plastic material, such as, for example, articles molded by heat expansion of polystyrene particles in a mold cavity formed by abutting complemental edges of mold parts, the surfaces of the molded articles are forced by considerable pressure into contact with or against the inner surfaces of said mold parts defining said mold cavity and, therefore, such surfaces of the articles conform closely to the minute contours of said inner surfaces and cling or stick thereto due to adhesion or molecular attraction between the contacting surfaces. Such adhesion or molecular attraction is especially prevalent when said articles are expanded by steam supplied to the mold cavity. When the mold parts are separated following the molding of an article, such article usually remains adhered to the mold part whose inner surfaces have the greatest area in contact with the surfaces of the formed article and difficulty has been encountered in readily removing the article from such mold part. Accordingly, the apparatus of the present invention was developed to aid in separating expanded plastic articles from surfaces of mold cavities in which the articles are formed and in the removal of each such article from such cavities.

SUMMARY OF THE INVENTION

In practicing the invention there is provided a pressurized fluid actuated hollow rod having a head on one end thereof which is inserted into a mold cavity prior to the expansive forming of an article in such cavity and so that, during such forming, the expanded plastic used for forming the article surrounds such head for subsequent removal of the article from a part of the mold cavity. Following such removal of the formed article the rod is actuated by pressurized fluid to disembed said head from the article and pressurized fluid is then supplied through the hollow of the rod to strike a surface of the article and complete the removal thereof from the mold parts previously abutted to provide said mold cavity.

BRIEF DESCRIPTION OF THE DRAWING

The single drawing figure in the case comprises a view, substantially in cross-section, of one type of apparatus embodying the invention.

DESCRIPTION OF THE PREFERRED EMBODIMENT

Referring to the drawing in detail, there is shown a mold 11 comprising separable mold parts 12 and 13 whose edges abut to provide a mold cavity 14 in which is formed or molded articles such as 16 of an expanded plastic material such as thermally expanded polystyrene particles for example. The methods of forming such articles are well known in the art and, per se, form no part of the present invention, It is sufficient for the purposes of the present description to point out that an article such as 16 may, for example, be formed or molded in mold cavity 14 by supplying a measured quantity of polystyrene particles to such cavity and then thermally expanding the particles to fill the mold cavity by supplying steam to the cavity. Such steam may be so supplied through suitable passages extending through selected portions of the mold walls of mold 11 but, for purposes of simplification of the drawings, none of such passages are shown therein.

Mold 16 is shown as comprising only two separable mold parts 12 and 13 but it will be readily understood that such mold may comprise three or more separable parts depending on the configuration or contours of the articles such as 16 to be formed. As is well known in the art of molding, in order that a molded article may be removed from a mold cavity in which it is formed or molded, the mold must be made from a plurality of mold parts which cooperatively abut to provide the desired mold cavity, such number of parts depending on the configuration or contours of the mold cavity, that is, on the configuration or contours desired for the articles to be molded in such cavity. However, for purposes of illustration of the present invention, it is only necessary to show a simple mold cavity such as 14 formed by only two mold parts 12 and 13 in which articles such as 16 are molded in the form of rectangular blocks.

Mold part 13 is provided with a passage 21 which extends through a wall of the mold part and leads into mold cavity 14. A rod 22 having a head 23 and a beveled neck portion 24 which joins such head with the body of the rod normally extends through passage 21 with such head and neck portion protruding into mold cavity 14. Below said neck portion 24 rod 22 includes a shoulder portion 26 for purposes hereinafter discussed. Head 23 and shoulder portion 26 may, for example, be an integral part of rod 22.

Rod 22 further includes a first fluid passage 27 extending axially through a part of the length of the rod to a first orifice 28 in head 23 of the rod, such passage and orifice extending normal to the surface of the headed end of the rod as is obvious from a brief glance at the drawing. Rod 22 further embodies a second fluid passage 29 which connects with passage 27 in a region intermediate the ends of the rod and extends from passage 27 to a second orifice 31 in the outer or circumferential surface of rod 22.

A channel-shaped mounting means or support 36 is firmly secured to the outer surface of mold part 13 in alignment with said passage 21 in such mold part. Support 36 may be attached to mold part 13 in any convenient manner. Support 36 integrally includes a bumper or plate member 37 embodying a passage 38 aligned with passage 21 in mold part 13 and through which the body of rod 22 extends with the shoulder portion 26 of the rod somewhat spaced from the right-hand surface of the plate member (when viewing the drawing) under the normal or unactuated condition of the apparatus. The purpose of bumper or plate member 37 will be discussed hereinafter.

A bearing 41 is provided for rod 22, such bearing embodying a passage 42 including a first portion having an areal cross-section through which rod 22 snugly but slidably axially extends and a second enlarged portion providing, as hereinafter further discussed, a fluid chamber 43 annularly surrounding rod 22. The end of bearing 41 embodying said first portion of passage 42 extends through a passage 39 in support 36, such passage 39 and passage 42 in bearing 41 being aligned with the previously-mentioned passages 38 and 21 in plate member 37 and mold part 13, respectively. A shoulder portion of bearing 41 bears against one surface of support 36 adjacent said passage 39 in such support and a nut 45 is screwed onto cooperating threads provided on the end of bearing 41 extending through such passage. Nut 45 is tightened against the surface of support 36 opposite said one surface thereof and bearing 41 is thus securely attached to support 36 to slidably support rod 22.

The previously-mentioned annular fluid chamber 43 in bearing 41 connects with a first end of a fluid passage 44 also embodied in the bearing and extending from such chamber to the exterior of the bearing. A threaded first end of a fluid conduit 46 is screwed into cooperating threads provided in the second end of passage 44, and the second end of fluid conduit 46 is connected with a source of pressurized fluid suitable for actuation of the apparatus and which is periodically supplied thereto as hereinafter described. For purposes of simplification of the drawing said source of fluid is not shown therein.

There is shown surrounding the previously-mentioned intermediate region of rod 22 a gasket 47 which may, for example, be an O-ring such as is well known in the art. A sleeve or bushing 48 is also shown surrounding rod 22, such bushing being tightly fitted into a portion of passage 42 adjacent fluid chamber 43 with one of its annular rims bearing against gasket 47. Such arrangement assures, insofar as possible, that pressurized fluid supplied to fluid chamber 43 will not escape from such chamber by flowing about and along the outer perimeter of rod 22. However, the provision of gasket 47 and bushing 48 are not absolutely essential to the apparatus and that part of passage 42 through which said intermediate region of rod 22 extends could be of the same areal cross-sectional as and, therefore, a part or extension of the previously-mentioned first portion of passage 42.

A first end of a pressurized fluid motor 50 including a cylinder 51 having a bore 52 is hermetically attached to the end of bearing 41 opposite the end of such bearing attached to support 36. As illustrated in the drawing, motor 50 is attached to said bearing by external threads provided on said opposite end of bearing 41 and screwed into cooperative internal threads provided in a first end of bore 52 of cylinder 51. Fluid motor 50 further includes the usual piston such as 53 which is attached to the second end of rod 22 by being screwed onto cooperative threads provided on such end of the rod. Thus, rod 22 forms the piston rod of said fluid motor. A cap or plug 54 is provided at the second end of bore 52. One end of a compressible coil spring 56 bears against plug or cap 54 within bore 52 and the other end of such spring bears against piston 53 to normally spring bias the piston and, thereby, rod 22 to the positions shown in the drawing.

The structure of the apparatus of the invention having thus far been described, a brief operational example of the apparatus will now be given.

As previously mentioned, the apparatus is shown in the drawings in what is considered to be the normal condition of the apparatus, that is, with no pressurized fluid supplied to the apparatus and, therefore, with piston 53 biased by coil spring 56 to said first end of bore 52 in cylinder 51. Under such conditions rod 22 attached to piston 53 is correspondingly biased so that head 23 and neck portion 24 of the rod extend into mold cavity 14. At such time, orifice 31 in rod 22 is positioned within bearing 41 so that pressurized fluid thereafter supplied to fluid chamber 43 cannot immediately flow through said orifice and through passages 29 and 27 in rod 22.

With the apparatus in the condition described above, thermally expandable plastic particles are supplied to mold cavity 14 as previously mentioned, and, as also previously mentioned, such particles are thermally expanded within such cavity to form or mold an expanded plastic article such as 16. During the expansion of said particles to fill cavity 14 and, thereby, form or mold article 16 by fusion of such expanded particles to each other, some of the particles or parts thereof also form or mold about head 23 and neck portion 24 of rod 22 to embed such head and neck portion within the wall or the layers of the molded article which contact and are situated adjacent the inner surface 18 of the wall of the mold part 13.

Subsequent to the molding of an article such as 16 as described above and any necessary cooling of mold 11 and of article 16, one or the other or both of the mold parts 12 and 13 are moved away from each other in opposite directions to remove article 16 from mold cavity 14. It is apparent that, during said movement of mold parts 12 and 13, article 16 tends to adhere to the inner surfaces such as 17 of the walls of mold part 12 with a greater adhesion than to the inner surfaces such as 18 of the walls of mold part 13. It will also be recognized that if a molded article such as 16 remains in that part of the mold cavity defined by the inner surfaces such as 17 of the walls of mold part 12, considerable difficulty will be encountered in removing the article from such part of the mold cavity. However, by employing the apparatus of the present invention, when mold parts 12 and 13 are separated, the molded article 16 is held against the inner surface 18 of the wall of mold part 13 by that portion of the molded article surrounding head 23 and neck portion 24 of rod 22. Thus, formed articles such as 16 are removed from the mold cavity 14.

Following the separation of the mold parts 12 and 13 as described above and the resultant removal of a molded article such as 16 from mold cavity 14, pressurized fluid, such as compressed air from a suitable source thereof, is supplied to fluid conduit 46 and thence to fluid chamber 43. Such pressurized fluid supplies pressure to the annular part of the face of piston 53 surrounding rod 22, and overcomes the biasing force of spring 56 and actuates such piston within bore 52 of cylinder 51 towards said second end of such bore. Rod 22 is, of course, also actuated in such direction at such time. Such actuation or movement of piston 53 continues until collar portion 26 of rod 22 strikes bumper or plate member 37 of support 36. The described movement of rod 22 caused by said movement of piston 53 disembeds head 23 and neck portion 24 of rod 22 from within the molded article such as 16 by disruption of that part of the article surrounding such head and neck portion, and such head and neck portion are retracted within passage 21 in mold part 13.

The movement of rod 22, as discussed above, causes orifice 31 in such rod to move into fluid chamber 43 and the pressurized fluid then being supplied to fluid chamber 43 flows through such orifice and passages 29 and 27 in rod 22 and, thence, out through orifice 28 in head 23 of rod 22 to supply a jet of pressurized fluid against the article such as 16. That is to say, said pressurized fluid impinges upon the formed article 16 to overcome the adhesion or molecular attraction between the surface of such article contacting the inner surface 18 of mold part 13 and such inner surface, and, thereby, disengage the article from such mold part. Following such disengagement of the article, fluid conduit 46 is vented to atmosphere or to a suitable fluid sink and the pressurized fluid in chamber 43 flows through said conduit to such sink or to atmosphere. At such time, the compressive force of spring 56 returns piston 53 and rod 22 to their normal positions illustrated in the drawing and mold parts 12 and 13 can be again cooperatively abutted or engaged to reform mold cavity 14 in preparation for molding another article 16 therein.

Although there is herein shown and described only one form of the apparatus embodying the invention, it will be understood that various changes and modifications can be made therein within the purview of the appended claims without departing from the spirit and scope of the invention.

What is claimed is:

1. In combination with mold parts cooperatively abutting to provide a mold cavity in which plastic articles are formed by thermal expansion of heat expandable plastic particles to fill said cavity and thermal fusion of such particles to each other, apparatus for aiding in the separation of each article formed in such cavity from the surfaces defining the cavity and in the removal of each such article from the cavity, such apparatus comprising:
　(A) a rod having on a first end thereof a head and neck portion extending through an orifice in one wall of one of said mold parts and into said mold cavity, such rod embodying a first fluid passage extending axially through a part of the length of such rod and a first orifice in said first end of the rod, and a second fluid passage extending from said first fluid passage through a second orifice in the outer surface of the rod in a region intermediate the ends thereof;
　(B) a bearing embodying a passage including a first portion through which said intermediate region of said rod snugly but slidably extends and a second enlarged portion providing a fluid chamber annularly surrounding the rod adjacent the second end of the rod, such bearing also embodying a fluid passage extending from said fluid chamber through the outer surface of the bearing;
　(C) a pressurized fluid actuated motor including,
　　(a) cylinder having a bore whose first end is hermetically connected with said bearing and said fluid chamber therein,
　　(b) a piston reciprocatively movable within said bore of said cylinder and secured to said second end of said rod, and
　　(c) means for normally biasing said piston toward said first end of said bore and normally biasing said intermediate region of said rod within said first portion of said passage within said bearing,
　(D) means for securely supporting said bearing adjacent the exterior surface of said one wall of said one mold part to normally maintain said head and neck portion of said rod within said mold cavity, and
　(E) a fluid conduit hermetically connected with said orifice in the outer surface of said bearing for at selected times supplying pressurized fluid to said fluid chamber surrounding said rod and actuating said piston and said rod against said biasing means and in a direction toward the second end of said bore until said second orifice in the rod enters said fluid chamber, whereby said pressurized fluid then flows through said fluid passages in said rod and is ejected from said first orifice in the head of the rod.

2. Apparatus in accordance with claim 1 and in which said biasing means comprises a compressible coil spring housed in said bore of said cylinder, said pressurized fluid is compressed air and said plastic particles are polystyrene particles.

References Cited

UNITED STATES PATENTS

| | | | |
|---|---|---|---|
| 2,396,406 | 3/1946 | Anderson | 18—2RCX |
| 2,456,778 | 12/1948 | Gilchrist | 18—2RCUX |
| 2,629,897 | 3/1953 | Mahla | 18—2RC |
| 2,741,797 | 4/1956 | Britton | 18—2RCX |
| 2,828,509 | 4/1958 | Smucker et al. | 18—2RCX |
| 2,860,374 | 11/1958 | Harrison et al. | 18—2RCX |
| 2,929,105 | 3/1960 | Starck et al. | 18—2RCX |
| 2,959,818 | 11/1960 | Diehl et al. | 18—2RCX |
| 3,125,780 | 3/1964 | Harrison et al. | 18—5PUX |
| 3,183,551 | 5/1965 | Johnson | 18—2RC |

FOREIGN PATENTS

| | | | |
|---|---|---|---|
| 1,237,862 | 6/1960 | France | 18—2RC |

J. HOWARD FLINT, JR., Primary Examiner

U.S. Cl. X.R.

18—5; 249—68; 264—51